US012404977B1

(12) United States Patent
Von Fange et al.

(10) Patent No.: US 12,404,977 B1
(45) **Date of Patent: *Sep. 2, 2025**

(54) LIGHTING FIXTURE WITH 2D ARRAY OF CLOSELY-PACKED LED COMPONENTS

(71) Applicant: The Light Source, Inc., Charlotte, NC (US)

(72) Inventors: Eric Eugene Von Fange, Fort Mill, SC (US); Jeff Wright, Fort Mill, SC (US); Kevin J. Russell, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,485

(22) Filed: Aug. 14, 2023

Related U.S. Application Data

(63) Continuation of application No. 17/752,359, filed on May 24, 2022, now Pat. No. 11,725,784, which is a continuation of application No. 17/342,046, filed on Jun. 8, 2021, now Pat. No. 11,339,929, which is a continuation of application No. 16/934,633, filed on Jul. 21, 2020, now Pat. No. 11,028,975, which is a (Continued)

(51) Int. Cl.

| | |
|---|---|
| ***F21V 5/04*** | (2006.01) |
| ***F21K 9/23*** | (2016.01) |
| ***F21K 9/60*** | (2016.01) |
| ***F21V 23/00*** | (2015.01) |
| ***F21V 29/85*** | (2015.01) |
| *F21Y 101/00* | (2016.01) |
| *F21Y 105/00* | (2016.01) |
| *F21Y 105/12* | (2016.01) |
| *F21Y 113/00* | (2016.01) |
| *F21Y 113/13* | (2016.01) |
| *F21Y 115/10* | (2016.01) |

(52) U.S. Cl.
CPC .................. *F21K 9/60* (2016.08); *F21K 9/23* (2016.08); *F21V 5/04* (2013.01); *F21V 5/045* (2013.01); *F21V 23/003* (2013.01); *F21V 29/86* (2015.01); *F21Y 2101/00* (2013.01); *F21Y 2105/00* (2013.01); *F21Y 2105/12* (2016.08); *F21Y 2113/00* (2013.01); *F21Y 2113/13* (2016.08); *F21Y 2115/10* (2016.08)

(58) Field of Classification Search
CPC ...... F21V 5/007; F21V 5/045; F21Y 2105/10; F21Y 2105/12; F21Y 2105/14; F21Y 2113/10; F21Y 2113/13
See application file for complete search history.

(56) References Cited

U.S. PATENT DOCUMENTS 4,992,704 A 2/1991 Stinson
5,633,629 A 5/1997 Hochstein (Continued)

*Primary Examiner* — Ismael Negron
(74) *Attorney, Agent, or Firm* — Schwartz Law Firm, P.C.

(57) ABSTRACT

An LED lighting fixture includes a housing, a substrate located within the housing, a plurality of LED groups of various colors mounted on the substrate, each LED color group including multiple LED components, at least one circuit communicating with a power supply and adapted for powering the LED components, and an optical component located at an output end of the housing. The LED components are arranged along first and second directions orthogonal to one another, such that no two LED of the same color reside adjacent one another along both of the first and second directions, and each LED component is spaced-apart from an adjacent LED component a distance no greater than 1.0 mm.

16 Claims, 14 Drawing Sheets

Related U.S. Application Data continuation of application No. 14/947,651, filed on Nov. 20, 2015, now Pat. No. 10,718,474.

(60) Provisional application No. 62/082,240, filed on Nov. 20, 2014.

(56) References Cited

U.S. PATENT DOCUMENTS

| | | | | |
|---|---|---|---|---|
| 6,428,189 | B1 | 8/2002 | Hochstein | |
| 6,752,517 | B2 | 6/2004 | Hildebrand | |
| 6,936,978 | B2 | 8/2005 | Morgan | |
| 6,964,489 | B2 | 11/2005 | Blume | |
| 6,966,674 | B2 | 11/2005 | Tsai | |
| 6,999,318 | B2 | 2/2006 | Newby | |
| 7,175,305 | B2 | 2/2007 | Martineau | |
| 7,196,459 | B2 | 3/2007 | Morris | |
| 7,296,916 | B2 | 11/2007 | Ouderkirk et al. | |
| 7,347,589 | B2 | 3/2008 | Ge | |
| 7,602,057 | B2 | 10/2009 | Curran | |
| 8,042,964 | B2 | 10/2011 | Bogner | |
| 8,157,415 | B2 | 4/2012 | Tseng | |
| 8,262,252 | B2 | 9/2012 | Bergman | |
| 8,324,724 | B2 | 12/2012 | Wu | |
| 8,410,512 | B2 | 4/2013 | Andrews | |
| 8,482,226 | B2 | 7/2013 | Vinther | |
| 8,567,987 | B2 | 10/2013 | Wronski | |
| 8,717,679 | B2 | 5/2014 | Sassoon | |
| 8,820,963 | B2 | 9/2014 | Olsen | |
| 9,095,019 | B2 | 7/2015 | Chen et al. | |
| 9,148,918 | B2 | 9/2015 | Capodivacca | |
| 9,883,580 | B1 | 1/2018 | Vasoya | |
| 9,970,628 | B2 | 5/2018 | Zhang | |
| 10,718,474 | B1 * | 7/2020 | Von Fange | F21V 5/008 |
| 11,028,975 | B2 | 6/2021 | Von Fange | |
| 11,339,929 | B1 | 5/2022 | Von Fange | |
| 2007/0236956 | A1 | 10/2007 | Kolodin | |
| 2012/0230043 | A1 | 9/2012 | Kitagawa et al. | |
| 2015/0115823 | A1 | 4/2015 | Serra et al. | |
| 2016/0040854 | A1 * | 2/2016 | Zhang | F21V 14/06<br>257/89 |

* cited by examiner

LIGHTING FIXTURE WITH 2D ARRAY OF CLOSELY-PACKED LED COMPONENTS

TECHNICAL FIELD AND BACKGROUND OF THE INVENTION

This invention relates broadly and generally to a lighting fixture incorporating a high power density LED array.

According to prior art technology, an individual single color LED component or die is used with its own optical system. Different individual systems of different colors are grouped together to create the desired fixture output. For example, a 4-colored LED array is made with 4 different colors with single LED components or LED dies, and a 7-colored LED array is made with 7 different colors of single LED components or LED dies—each array using a single optical system for each of the single LED components. Multiple groups of these LED components and optical systems are arrayed together to achieve the desired total optical power required for the light fixture output. These multiple arrays produce multiple shadows of different colors on the background when the light fixture is projected onto an object or person in the foreground. A shadow is created from each of the multiple optical systems in the lighting fixture. This is different than the traditional way of creating colored light by placing a color filter in the optical path of a light fixture. The greatest majority of incandescent light fixtures have one lamp with its optical system producing one shadow on the background from the light projecting onto an object or person in the foreground.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises an LED lighting fixture. The lighting fixture comprises a fixture housing, and a high power density LED array (or module) located within the fixture housing. The LED array comprises a mounting substrate, a plurality of closely spaced LED components carried on the mounting substrate, and at least one LED circuit communicating with a power supply and adapted for powering the LED components. The LED components are arranged in multiple color groups, each color group comprising multiple LED components. Each LED component is spaced-apart from an adjacent LED component a distance no greater than 1.0 mm. An optical component is located at an output end of the fixture housing.

As commonly known and understood in the art, a light-emitting diode (or LED) is a two-lead semiconductor light source comprising a p-n junction diode which emits light when activated. When a suitable voltage is applied to the leads, electrons recombine with electron holes within the device, releasing energy in the form of photons. This effect is called electroluminescence, and the color of the light (corresponding to the energy of the photon) is determined by the energy band gap of the semiconductor. A single LED component is generally small in area, and may comprise integrated optical components used to shape its radiation pattern. In one embodiment, the mounting area of the LED component is 2.5 mm squared, and in another embodiment the mounting area is 1.6 mm squared, and in a third embodiment the mounting area may be 1.0 mm squared (e.g., using LED dies). In each embodiment, the gap or spacing between adjacent LED components may be 0.33 mm or less.

An LED circuit refers an electrical circuit used to power one or more LED components. The circuit provides sufficient current to light the LED components at the required brightness, while limiting the current to prevent damaging the components.

According to another exemplary embodiment, each LED component is spaced-apart from an adjacent LED component a distance less than 0.5 mm.

According to another exemplary embodiment, each LED component is spaced-apart from an adjacent LED component a distance less than 0.25 mm.

According to another exemplary embodiment, the LED components comprise colors selected from a group consisting of red, green, blue, and white.

According to another exemplary embodiment, the LED components operate at different color temperatures capable of producing multiple distinct colors of white light.

According to another exemplary embodiment, the LED mounting substrate comprises a thermally conductive ceramic material.

According to another exemplary embodiment, the ceramic material is selected from a group consisting of beryllium oxide and aluminum nitride.

According to another exemplary embodiment, the LED array comprises a plurality LED series circuits. In one configuration, the source voltage may be greater than or equal to the sum of the individual LED component voltages, and a single current-limiting resistor may be used for each string. The LED components may be arranged such that each string can be individually turned on and off, and dimmed.

According to another exemplary embodiment, each LED series circuit operatively connects multiple like-colored LED components.

According to another exemplary embodiment, at least two of the plurality of LED series circuits are operatively connected in parallel. The parallel LED circuits may have closely matched forward voltages (Vf) in order to have similar branch currents and, therefore, similar light output.

According to another exemplary embodiment, the lighting fixture comprises an LED driver with analog dimming for brightness control and color mixing of the exemplary LED array.

According to another exemplary embodiment, the optical component comprises a Fresnel lens.

According to another exemplary embodiment, the optical component comprises a light diffuser lens.

According to another exemplary embodiment, the optical component comprises an LED condenser lens.

According to another exemplary embodiment, the LED components are arranged such that no two like colors reside horizontally adjacent one another.

According to another exemplary embodiment, the LED components are arranged such that no two like colors reside vertically adjacent one another.

According to another exemplary embodiment, the LED components are arranged such that no two like colors reside either horizontally or vertically adjacent one another.

According to another exemplary embodiment, the LED array comprises greater than 200 LED components across a substrate surface area of less than 120 cm squared.

According to another exemplary embodiment, the LED components comprise high-brightness LED components (HBLEDs) capable of producing a maximum brightness of greater than 50 lumens per component. HBLEDs are generally available in blue and white, and may offer improved heat dissipation and an increased lifetime of over 100,000 hours.

In another exemplary embodiment, the present disclosure comprises a high power density LED array. The LED array comprises an LED mounting substrate, and a plurality of closely spaced LED components carried on the mounting substrate. The LED components are arranged in multiple color groups, each color group comprising multiple LED components. Each LED component is spaced-apart from an adjacent LED component a distance no greater than 1.0 mm. The LED components are arranged such that no two like colors reside either horizontally or vertically adjacent one another. At least one LED circuit communicates with a power supply, and is adapted for powering the LED components.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article “a” is intended to include one or more items. Where only one item is intended, the term “one”, “single”, or similar language is used. When used herein to join a list of items, the term “or” denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
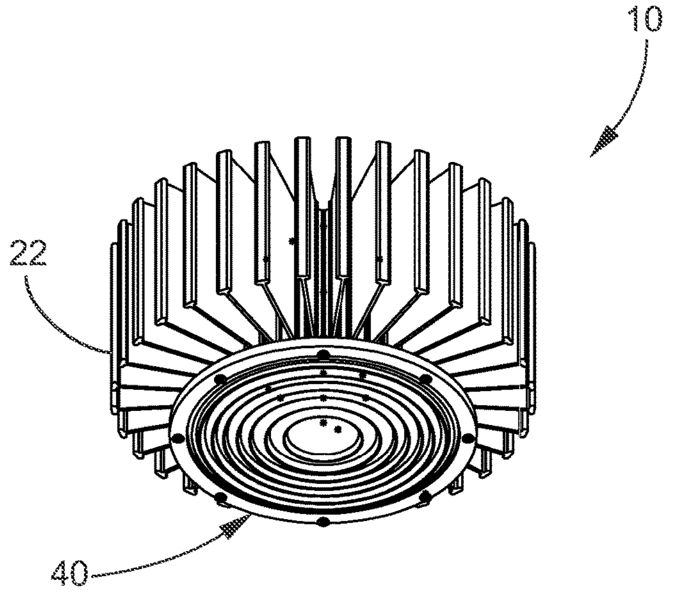
FIG. 1 is a perspective view of an LED lighting fixture according to one exemplary embodiment of the present disclosure.
Figure 3:
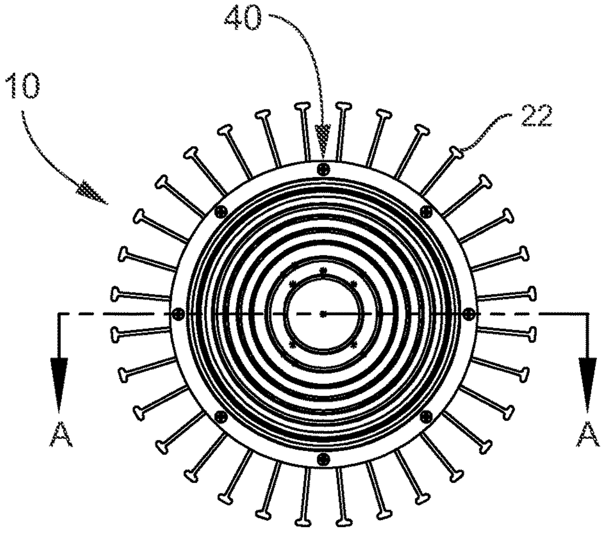
FIG. 3 is a plan view of the exemplary LED lighting fixture.
Figure 2:
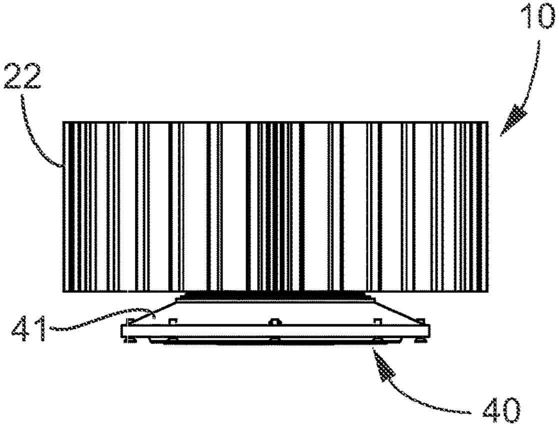
FIG. 2 is a side elevation of the exemplary lighting fixture.
Figure 4:
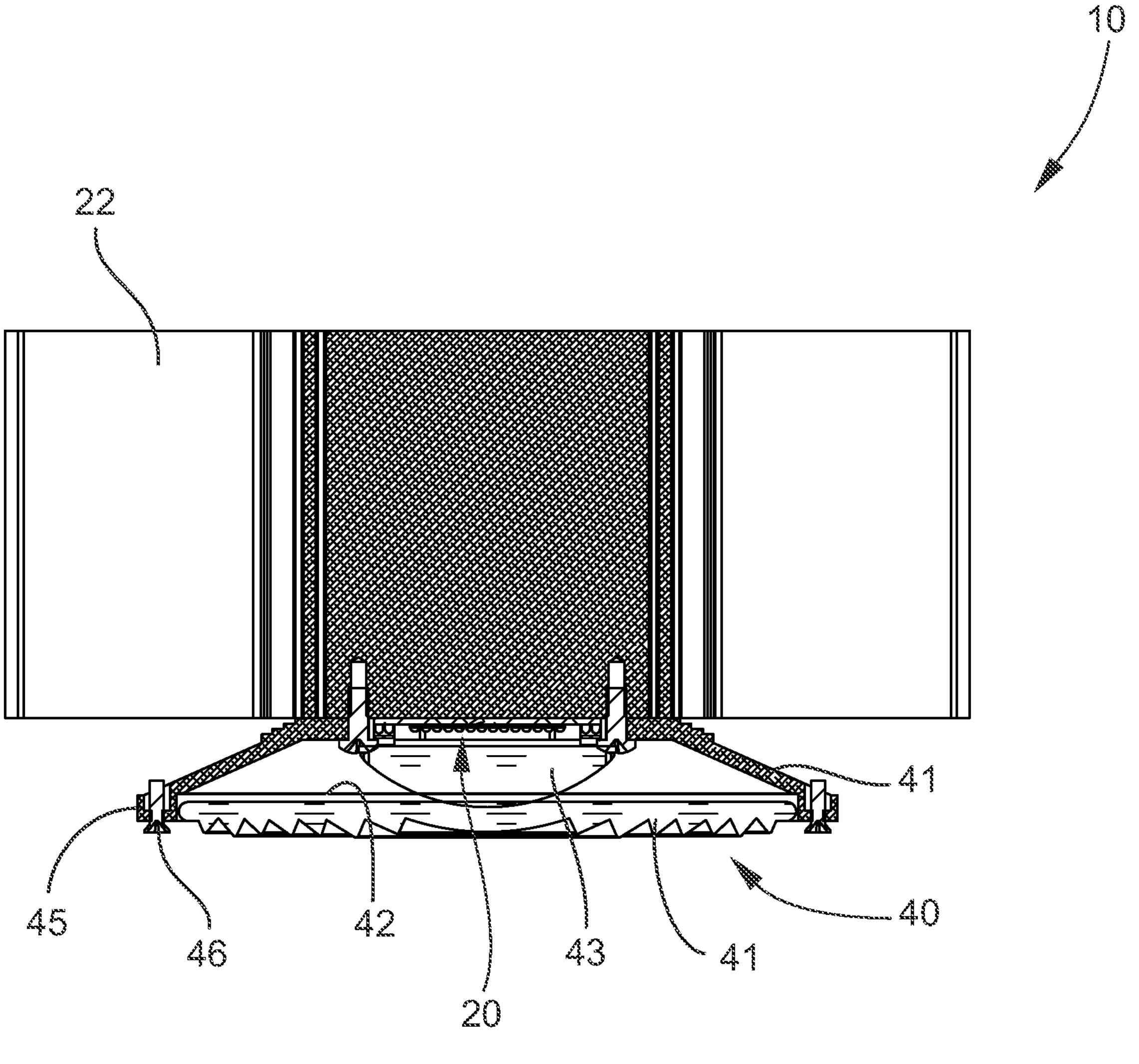
FIG. 4 is a cross-sectional view taken substantially alone lines A-A of FIG. 3.
Figure 5:
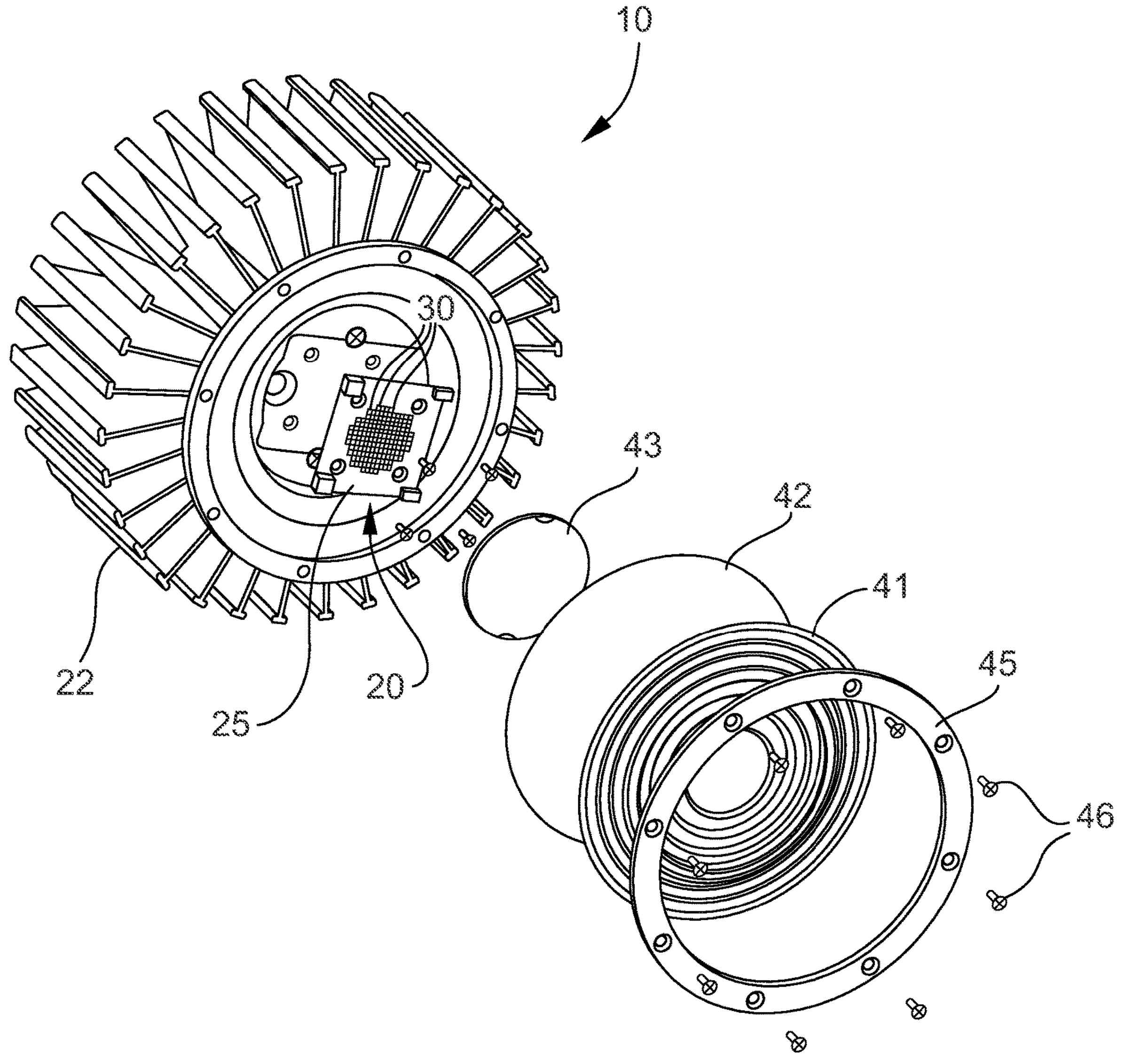
FIG. 5 is an exploded perspective view of the exemplary LED lighting fixture.
Figure 6:
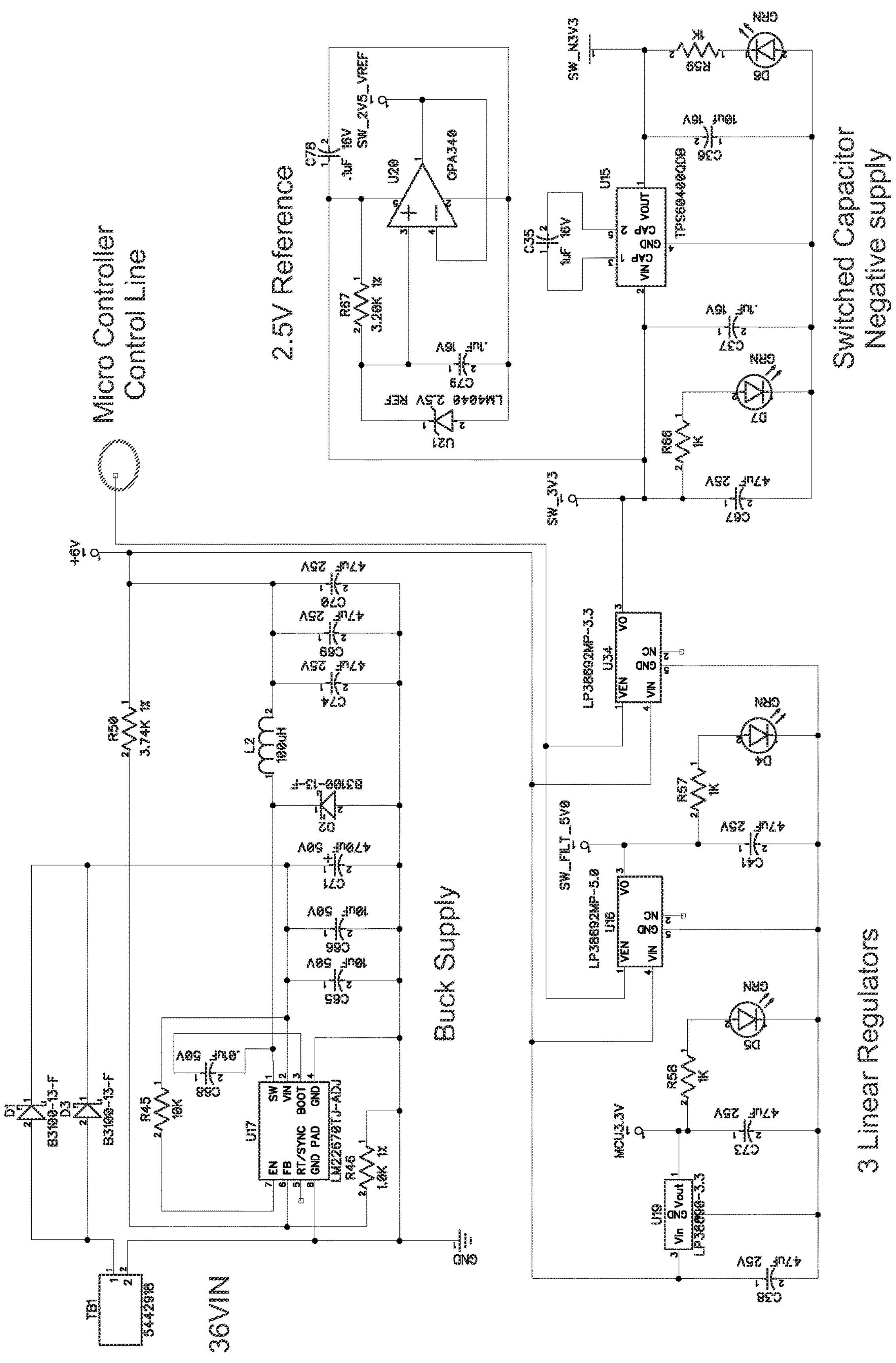
FIGS. 6, 7, 8, and 9 are schematic diagrams illustrating circuitry for controlling output to the LED array.
Figure 7:
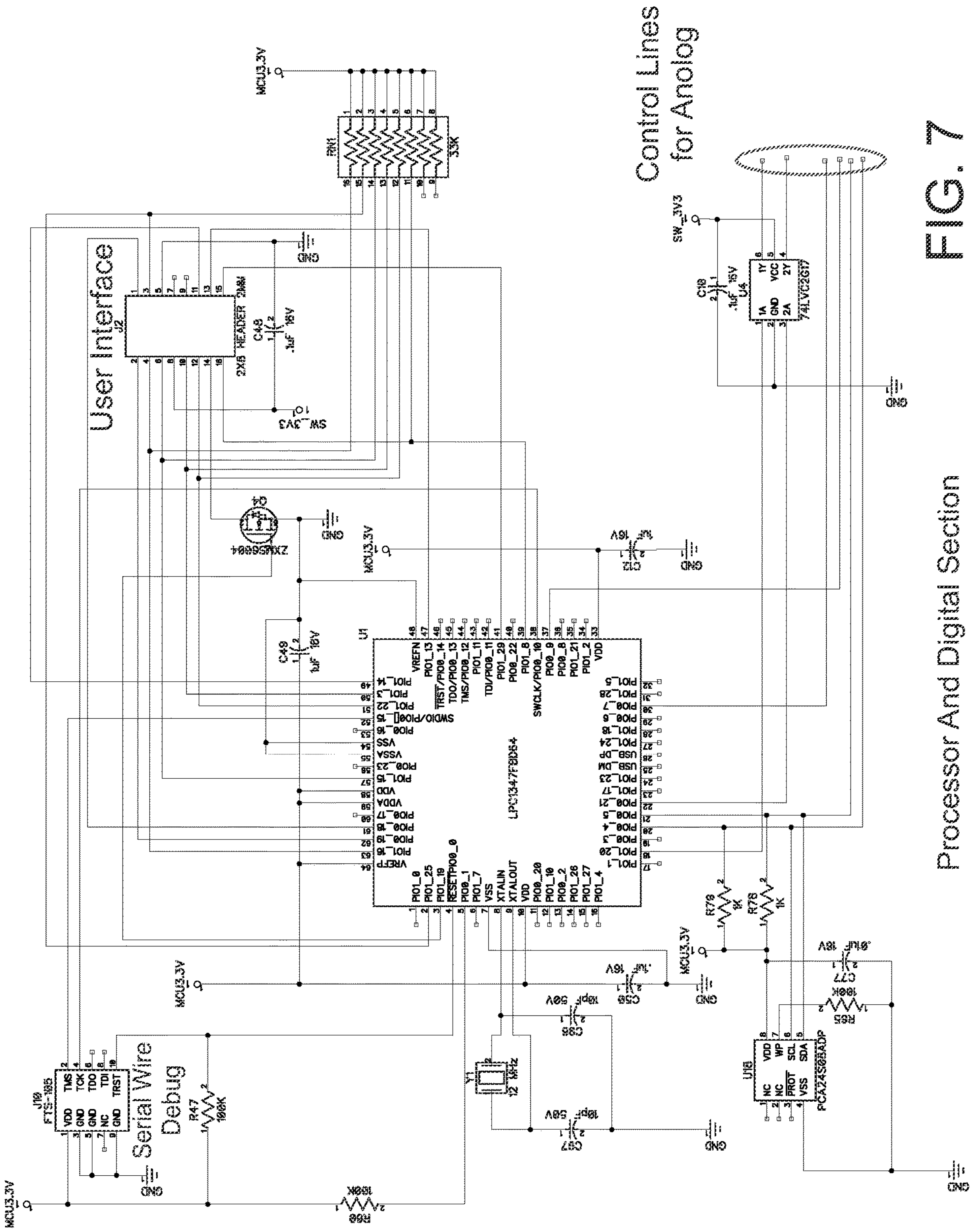
Figure 8:
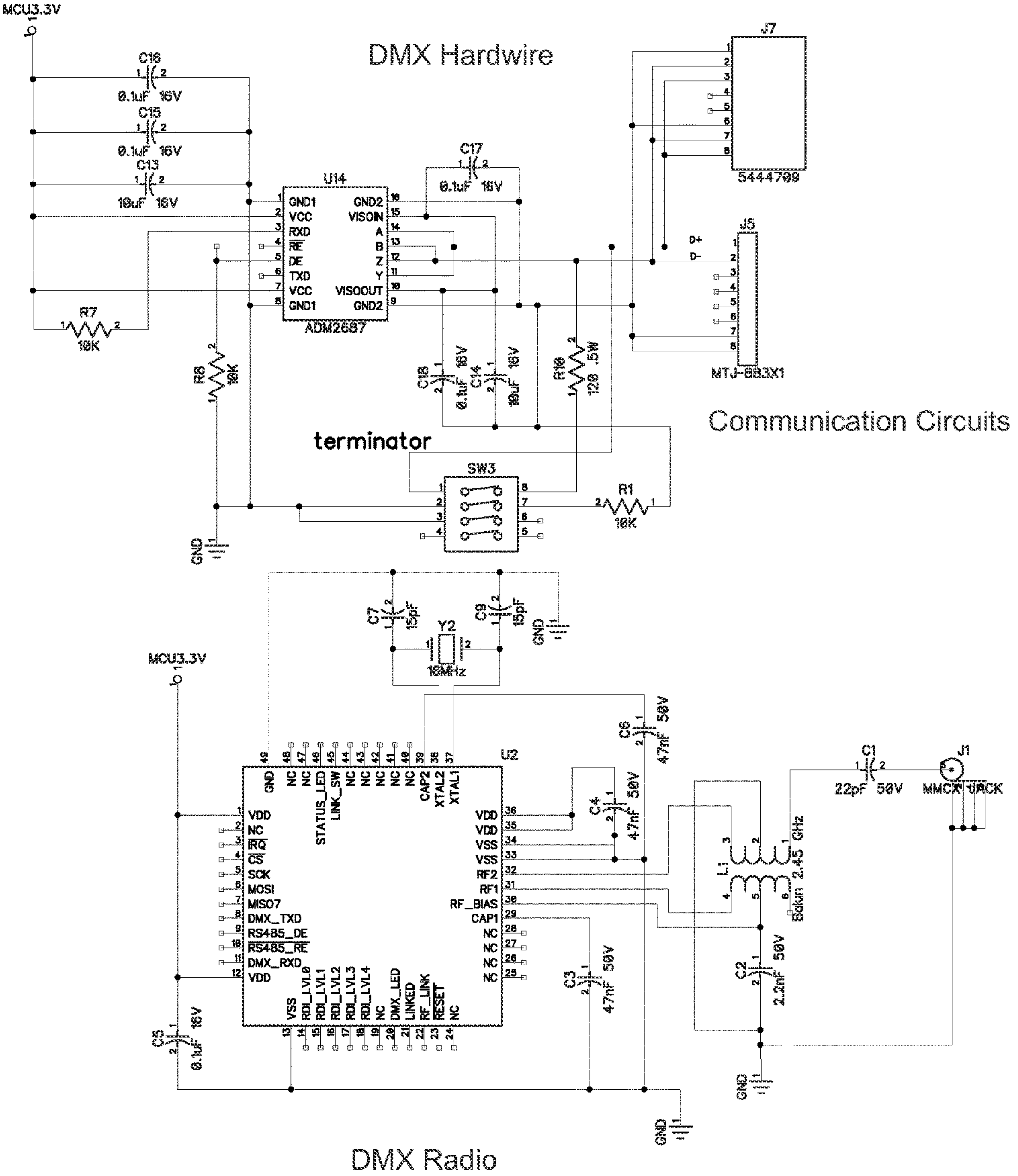
Figure 9:
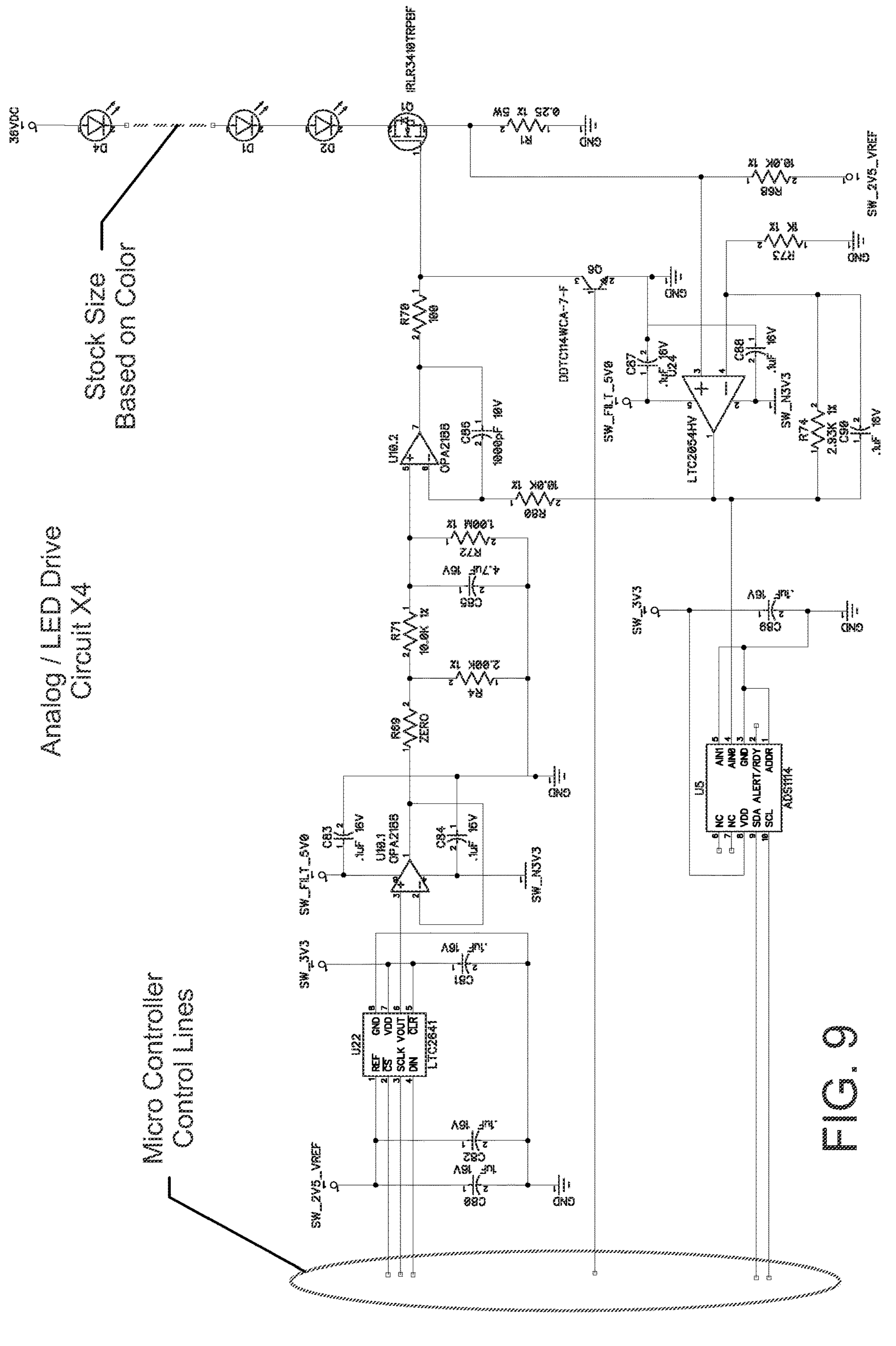

Referring now specifically to the drawings, an LED lighting fixture according to one exemplary embodiment of the present disclosure is illustrated in FIG. 1, and shown generally at broad reference numeral 10. As best shown in FIGS. 2-5, the exemplary lighting fixture 10 comprises a high power density LED array 20 (or module) located within a fixture housing 21, and operatively connected to a heat sink 22 or other suitable heat exchanger. The LED array 20 comprises an LED engine built on a multi-layer printed circuit board (PCB) 25 and thermally engineered to accommodate a plurality of closely spaced, high-brightness LED components 30. The exemplary PCB 25 may utilize “driver on board” or “chip on board” technology generally known in the industry.

The LED array 20 is arranged in multiple color groups, as described further below, with each color group comprising multiple LED components 30 of different colors or color temperatures. In one exemplary embodiment, each LED component 30 is spaced-apart from an adjacent LED component a distance no greater than 1.0 mm. In another example, the LED components 30 are spaced apart less than 0.5 mm from one another. In a third example, the LED components 30 are spaced apart less than 0.25 mm from one another. In each example, the LED components 30 are individually situated in the array 20. LED components 30 of like colors (or like color temperatures) are operatively connected together in strings powered by at least one LED series circuit communicating with a power supply and LED driver described below. An optical component 40 is located at the output end of the fixture housing 21, and comprises a Fresnel lens 41, light diffuser lens 42, and LED condenser lens 43 (and optionally, other optical components, such a reflector or the like). The exemplary optical component 40 is secured to the fixture housing 21 by retaining ring 45 and suitable hardware 46. In the present fixture, a single optical system is utilized for the entire high power density LED array 20 in a single, integrated, unitary lighting system.

Heat Management

The exemplary lighting fixture 10 features a high power density LED array 20, and an ability to run its entire LED power budget to any single color LED circuit in the array, or to run the entire LED power budget to any combination of the LED colored/color temperature circuits in the array. For effective heat management, the exemplary LED array 20 utilizes a multi-layered printed circuit board incorporating a substrate with high thermal conductivity (for reduced thermal resistance) and alternating applied dielectric polymer layers. The exemplary mounting substrate comprises a ceramic material, such as beryllium oxide or aluminum nitride, with at least a 75 w/mK thermal conductance. Alternatively, the PCB may feature a conductive metal core comprising copper or aluminum. Another example of an LED mounting substrate is described in prior Application Pub. No. US 2012/0230043. The complete disclosure of this published document is incorporated herein by reference. The dielectric layers function to separate circuits from the mounting substrate and electrically conductive layers, and to bring the electrical circuits to the LED components 30 of the array 20. The electrically conductive layers may be operatively joined together at points using vias through one or more of the dielectric layers. The LED components 30 in the array 20 are tightly spaced apart (e.g., about 0.25 mm), and may be soldered or thermally bonded directly to the mounting substrate to help manage heat through direct metal-to-metal contact. The exemplary LED array 20 may comprise greater than 200 LED components 30 across a substrate surface area of less than 120 square centimeters.

Figure 21:
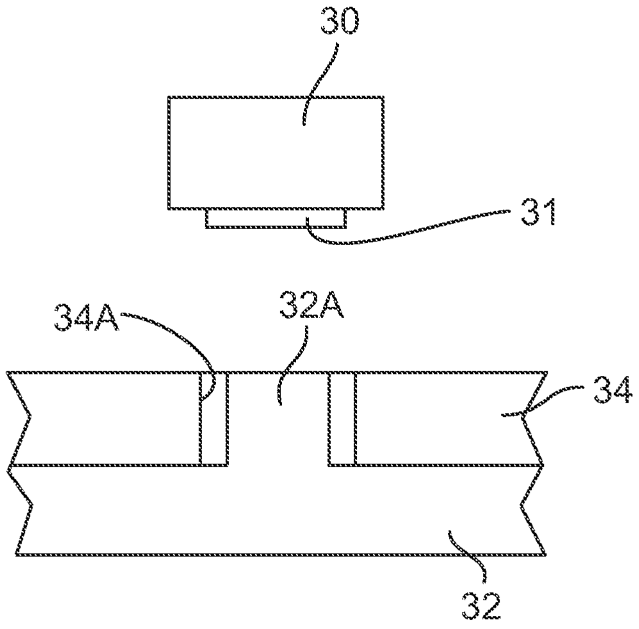
FIG. 21 is a diagrammatic drawing illustrating exemplary features of the present LED component, PCB and substrate.

Referring to diagrammatic FIG. 21, in one embodiment, each LED component 30 comprises a thermal bonding pad 31 (which is not part of the electrical circuit) soldered or thermally bonded directly to the conductive (e.g., copper) substrate 32 or heat sink. Copper bosses 32A may be formed with the substrate 32 to reside under and connect to the thermal pads 31 of the LED components 30. The dielectric and circuit layers are then placed around and in between these raised copper bosses 32A. The thermal path from the LED component 30 to the thermally conductive substrate 32 is short—e.g., a distance of between about 0.004 and 0.008 inches on a single layer board. Each additional conductive and dielectric layer combination adds an additional 0.004 to 0.008 inches to the thermal path. The thermal path may be improved by using a PCB 34 having a window 34A (or "via") which matches the full size of the LED component's thermal pad 31, and may be further improved by soldering to the thermal pad 31 to the copper boss 32A which reaches a top surface of the PCB 34. By maximizing the thermal conductivity of the solder or other thermal bonding material, and keeping the thermal distance to be traveled to a minimum, the LED component 30 will remain relatively cool when activated. This cooler operation enables the tight grouping of LED components 30 in the LED array 20 without damaging or destroying the components, and may also increase LED brightness and maximize LED life.

Exemplary LED Driver

The LED driver in the exemplary lighting fixture 10 comprises an electrical device that regulates power to the LED array 20—supplying a constant amount of current to the LED components 30, as electrical properties change with color temperature. The exemplary LED driver features analog dimming, described further below, which enables brightness adjustment of the LED light output over the full range from 100% to 0%.

In one embodiment, the LED drive circuitry may be separated from the multi-layer thermally conductive PCB to prevent the heat generated by the driver from raising the LED junction temperature. This further promotes effective and efficient heat management, and an ability to tightly space the multi-colored LED components 30 in the exemplary array 20. The multi-layer PCB provides the circuitry to connect all of the LED components 30 of a color into a series circuit to match the LED component circuit voltage requirements with the LED driver output voltage. The present lighting fixture 10 may comprise at least one series circuit powering each color string of LED components 30 used in the array 20. In other words, a first series circuit may operatively connect all green LED components 30 in the array 20, a second series circuit may operatively connect all red LED components 30 in the array 20, a third series circuit may operatively connect all blue LED components 30 in the array 20, and a fourth series circuit may operatively connect all white LED components 30 in the array 20. The multiple series circuits may be operatively joined in parallel such that each color string may have closely matched forward voltages (Vf) in order to have similar branch currents and, therefore, similar light output. In one configuration, the source voltage may be greater than or equal to the sum of the individual LED component voltages, and single current-limiting resistor may be used for each string. The LED components 30 may be arranged such that each color string can be individually turned on and off, and dimmed.

All of the series circuit traces of a color group may be designed to be as close to same length as is reasonably possible to maintain the closest total series resistance for all series groups that are joined together in parallel. This helps maintain the same current flow through each series string. The desired circuit performance is for the electrical current to choose to flow equally through each series group that are combined into the parallel group. As indicated above, the LED components 30 may be arrayed in multiple series circuits that are in parallel (for each color) to achieve the required output power. These can be scaled to almost any size.

In one basic example, the exemplary lighting fixture 10 utilizes a common constant-current, closed-loop-control LED driver circuit. In this circuit, the LED current is sensed through a resistor in series with the LED components 30. The voltage across the resistor, proportional to the LED current, is then used by the feedback (FB) input pin of a regulator to adjust the control mechanisms and modify the voltage applied to the LED component 30 in order to maintain the current through it constant. By artificially manipulating the signal going into the regulator's FB pin, the LED driver's constant-current value can be altered and adjusted. Analog dimming can be achieved by adjusting the LED current (and hence the LED brightness) through a DC control voltage using, for example, a simple potentiometer.

Other examples of analog dimming circuits are provided in prior U.S. Pat. Nos. 9,148,918 and 9,095,019, and prior Application Pub. No. US 2015/0115823. The complete disclosures of these published documents are incorporated herein by reference.

Exemplary DMX2 Circuit

Referring to FIGS. 6-9, the present lighting fixture 10 incorporates a DMX2 circuit for controlling the output to the LED array 20. As known and understood in the industry, DMX comprises a standard adopted by the Entertainment Services Technology Association for controlling lighting equipment and related accessories. In the exemplary embodiment, the purpose of the DMX2 circuit is to receive DMX control information and translate that information into 4 channel LED color and light level output. The DMX2 circuit can be broken down into 4 major divisions as follows: power supply, processing/digital, communication, and analog/LED drive.

The power supply is in general a DC to DC converter taking the bulk voltage of approximately 36 volts to voltages suitable for the on board electronics. U17 is the first stage of the conversion using a very efficient BUCK type switching power supply the LM22670T which drops the bulk voltage to 6 VDC. The 6 VDC provides the input rail voltage for the 3 linear regulators (U19, U16, U34) which further drop the voltage to the circuit operational voltages. U19 provides 3.3 VDC for the logic circuits, U16, and U34 provide, +5 VDC and 3.3 VDC respectively for the analog circuitry. These regulators (U16, U34) also have the capability to be switched off by the processor for very low power standby operation. The final 2 stages of the power supply are powered from U34. They consist of a switched capacitor inverting regulator providing −3 VDC also for the analog circuitry, and a voltage follower OP-AMP circuit providing a low impedance 2.5V reference for the analog circuitry.

The processing and digital division comprises an ARM architecture micro controller (e.g., NXP LPC1374). The processor coordinates all control of the DMX2 circuit. Principally, information is brought into the processor via the communication section and the human interface module. The software contained on the micro controller interprets the data and then provides the digital signals necessary to bring about the desired output. The digital interface to the Communication and Analog sections will be covered in those sections.

The DMX2 circuit has 2 communication paths, either hard wire or wireless. The DMX communication is a protocol for disseminating information to many devices on the same communication lines. The hardware interface however (hardwire configuration) is a differential protocol RS485. The DMX2 circuit uses a RS485 transceiver that provides isolation from the cable bus in a half-duplex configuration. The transceiver converts the differential signaling to an asynchronous serial data stream that is presented to the micro controller with a baud rate of up to 250 k baud. The wireless receives the DMX information via a radio signal. The radio chip converts the radio signaling to a synchronous serial protocol (SPI) which is presented to and controlled by the micro controller.

The DMX2 circuit has 4 identical analog/LED drive circuits 1 channel for each of the color LED strings. The circuit is based on the fact that the LED light output is proportional to current through the device. The circuit uses a 16 bit DAC (digital to analog converter) to set a current level through the LED string. The DAC output is buffered by a unity gain voltage follower amplifier. The reference voltage for the DAC is 2.5 volts making the span 0 to 2.5 volts. The amplifier then drives into a low-pass filter with frequency cut off approximately 20 Hz. This filter is primarily for the removal of any high frequency digital noise. The output of the filter then is used to drive a current amplifier. The current amplifier consists of the amplifier (i.e., U10.2) which drives the high power MOSFET transistor. The current through this transistor and consequently through the LEDS also goes through the 0.25 Ohm current sense resistor. The voltage generated on the current sense resistor is fed back through an OP-AMP (i.e., U24) which provides the closed loop to the input amplifier (U10.2).

The 1000 pF capacitor across the amplifier input provides bandwidth limiting to prevent overshoot and ringing in the circuit. The voltage output of the amplifier will go to whatever voltage is necessary to turn on the transistor such that the current through the 0.25 ohm resistor generates a voltage proportional to the DAC voltage output. The voltage across the 0.25 ohm resistor feeds into the feedback amplifier which has a gain of 4. This means that a DAC voltage of 1 volt will translate to 0.25 Volts across the 0.25 ohm resistor this implies that 1 volt on the DAC output is equivalent to 1 Amp of current through the LED string. This further implies the current span is from 0 to 2.5 Amps per channel. Resistor R68 10K provides a small amount of positive offset so that the signal does not go negative on the ADC (analog to digital converter). The ADC provides feedback to the micro controller. If everything is working perfectly, the expected output of the ADC would be equal to that of the DAC. The transistor (Q6) provides a digital way to shut down the current amplifier by removing the gate drive to the LED drive MOSFET. This can be done with any DAC setting so that a peak value can be set and the toggled off by turning Q6 on.

Exemplary DMX Software

Figure 10:
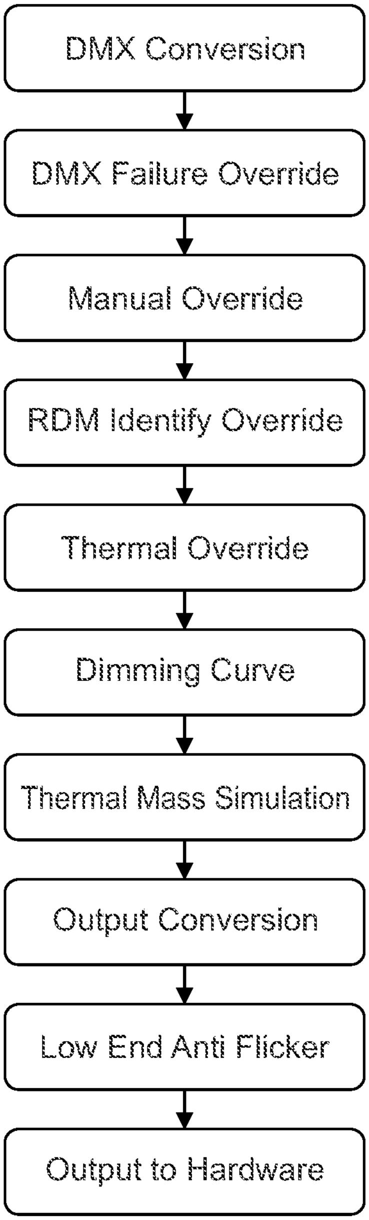
FIG. 10 is a flow diagram illustrating operation of the dimmer control feature of the exemplary LED driver circuit.

Referring to the diagram of FIG. 10, the software for the DMX2 has 4 main functions as follows: (a) receive user information from multiple sources, (b) decode this information, (c) control the analog/LED drivers to perform the functions desired by the user, and (d) monitor the system for faults.

Receiving Information:

The DMX2 has 3 sources of user input: DMX radio, DMX hard wire, and User Interface board. Software monitors all three sources. When data is presented on one of the sources, the software controls the hardware interaction to receive that information and determines the type of information such as setup in the case of the User Interface or lighting control from a DMX source. In the case of the User Interface, responding messages are sent to the display to provide the user with feedback as to the modes, setups, DMX2 addressing, etc.

Decoding:

The DMX2 software performs multiple levels of decoding. First at the hardware level the serial stream coming from the DMX sources must be evaluated to only react to those streams of information directed to selected addresses assigned for the DMX2 controller. DMX2 controllers have 4 lighting control addresses that are sequential and represent each of the 4 channels. Once a stream of data is determined to be for "this" controller, the software stores the stream in memory until the entire message is received for further processing. In the case of the User Interface, a menu structure exists and through use of 6 input buttons, software determines the Users desired input primarily for system setup information. This information is stored permanently so that the setup information such as addresses is retained through power cycles.

Analog Control:

This is a principle component of the system. The information received from the DMX sources must be evaluated, and then becomes part of the equation based on the desired mode of operation. There are many considerations the software must take into account such as the maximum power configuration for each of the LED strings, and the Lamp as a whole. On the other end of the spectrum, the Software must compensate for low level flicker to ensure smooth transitions through the lower few control bits of the DMX range. Algorithms have been developed to change brightness in ways to simulate the thermal mass of tungsten lamps, and to provide the user different modes for color mixing. All of this information is calculated and presented to the DMX2 analog sections in the form of 16 bit data streams to each of the analog circuits where the on board DAC (digital to analog converter) start the process to form the analog signal that sets the actual current level for each LED string. It should be noted that data from the DMX source can occur at rates of 40 times per second. However, once a transition is desired from one level to another, many times more intermediate levels are calculated and updated to the DACs to provide smooth transitions that are pleasing to the eye.

Faults:

The DMX2 software has the capability of determining faults in the system and taking appropriate action. These faults fall into 3 categories, communication faults, lamp faults and thermal faults. In the case of the DMX signals, if the DMX2 controller determines that it has been too long since the last DMX transmission, the software through preset user setup will take the appropriate action such as staying at the last lighting level, or going to black for example. Lamp failure can be detected by monitoring the output of the ADCs (analog to digital converter) that provide real time information on the actual current being driven through the LED string. If this information varies from the expected value as presented on the DAC, then a fault has occurred. The hardware also provides sensors to determine the temperature of the driver section, and the LEDs these analog signals are presented to the processor ADC section where the software converts the analog signal to a digital format and determines if the circuitry is being heated beyond normal operating conditions. If this should occur, the software maintains the color mix of the lamp but reduces the overall intensity until the thermal fault falls into normal operating range.

Distributed Color Arrangement

Figure 19:
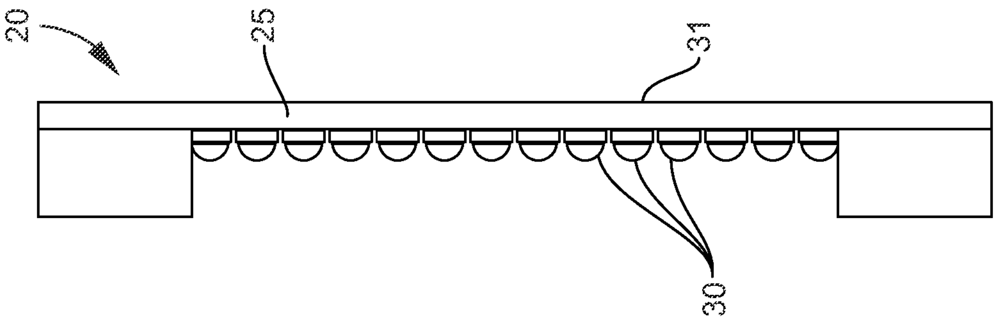
FIGS. 19 and 20 are side elevations of the LED engines illustrated in FIGS. 11 and 12, respectively.
Figure 11:
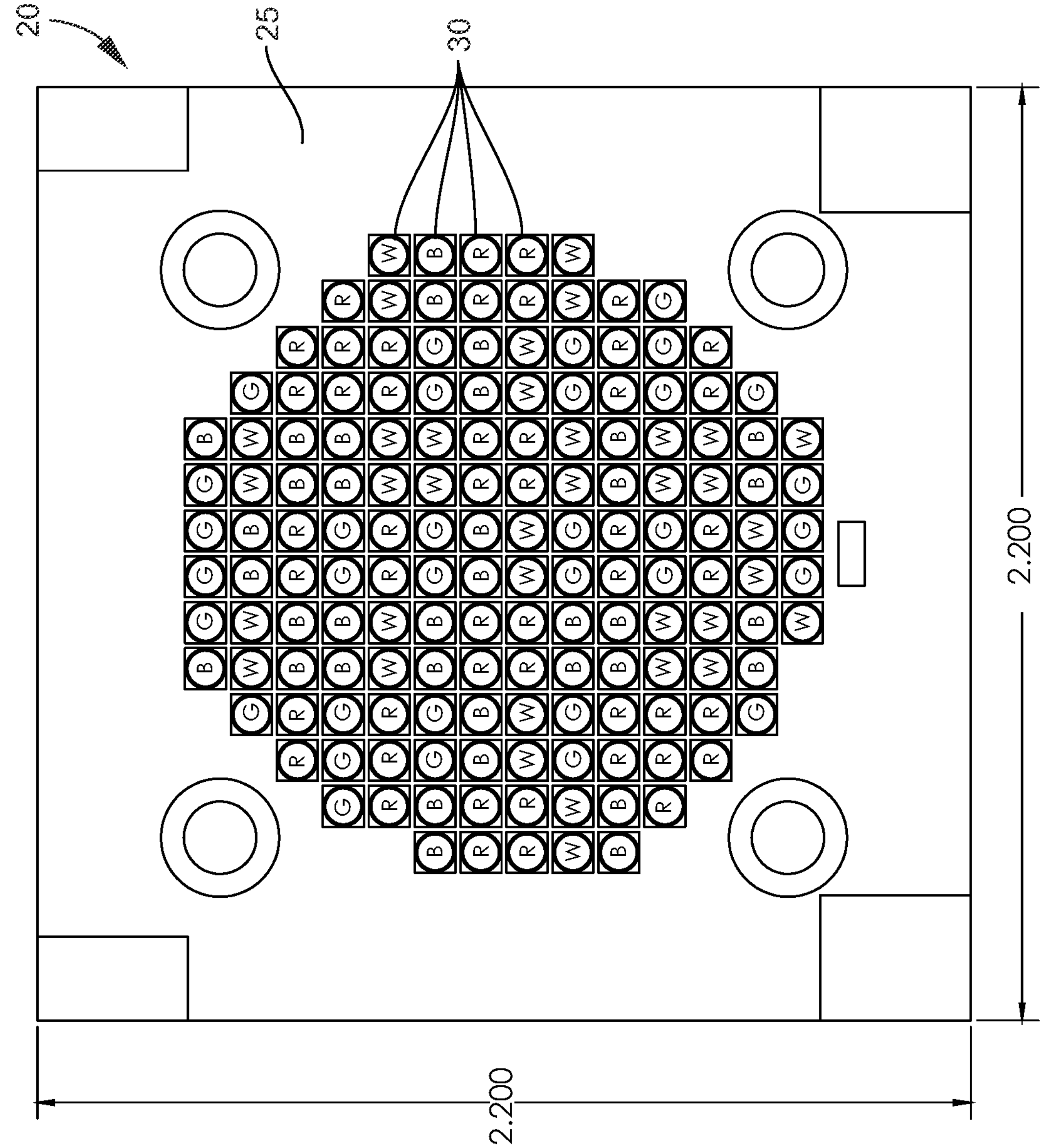
FIGS. 11-18 are color charts illustrating the color arrangement in exemplary LED engines of the present lighting fixture.
Figure 20:
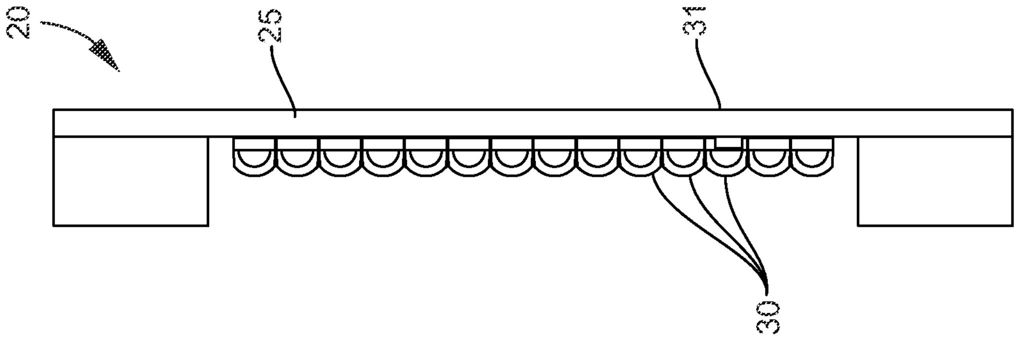
Figure 12:
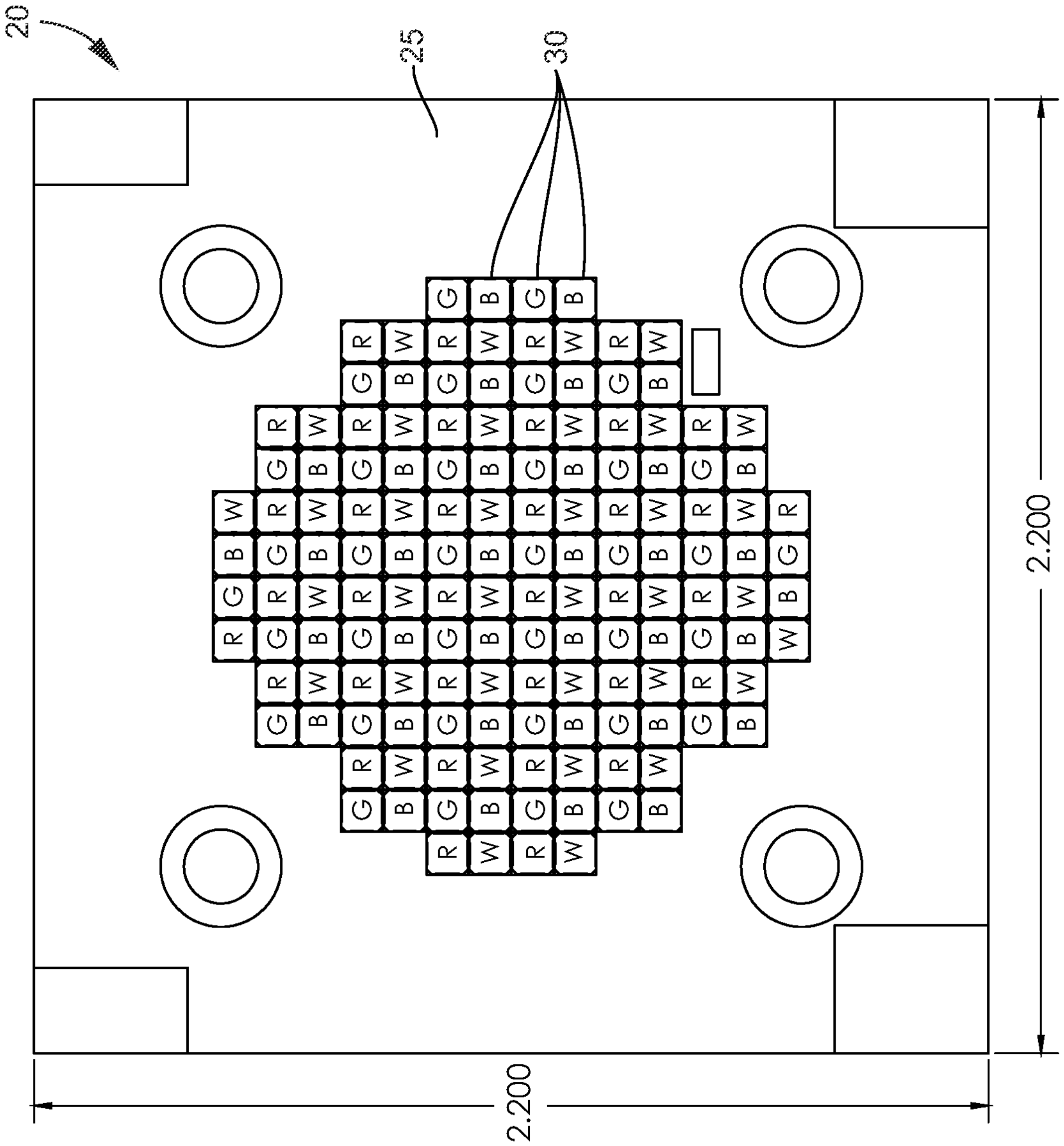
Figure 13:
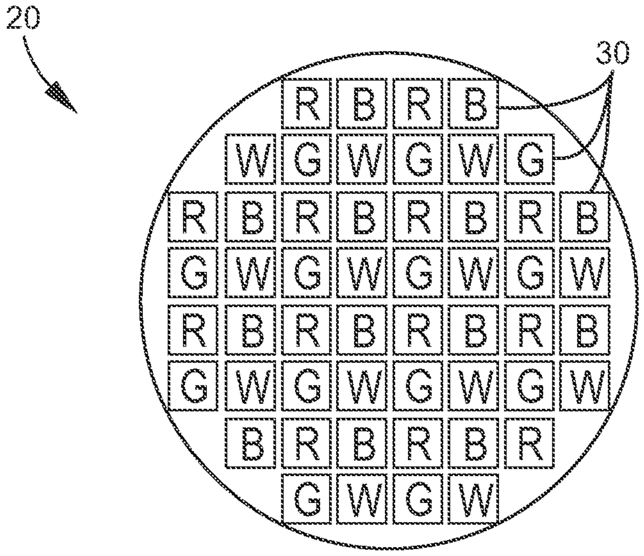
Figure 14:
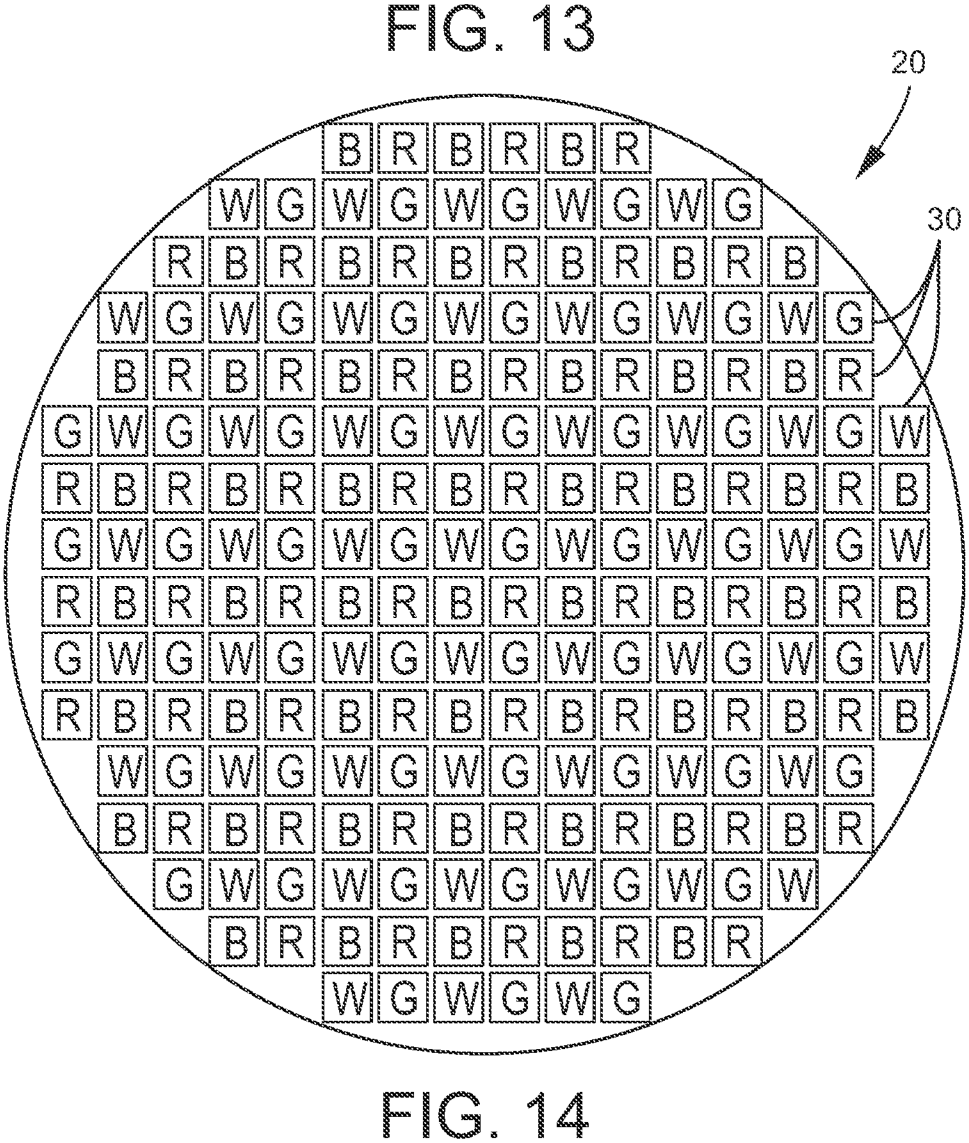
Figure 15:
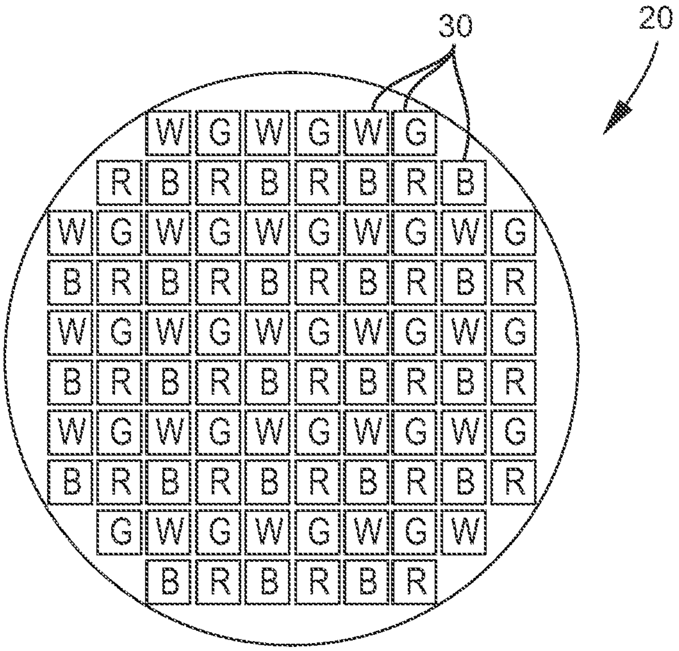
Figure 16:
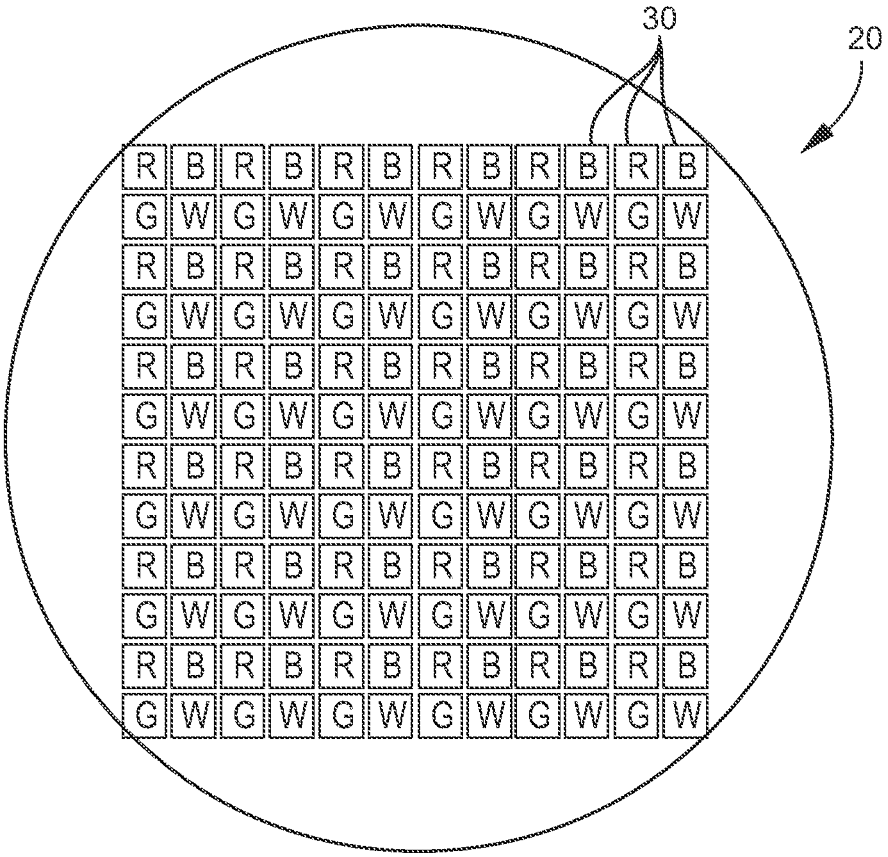
Figure 17:
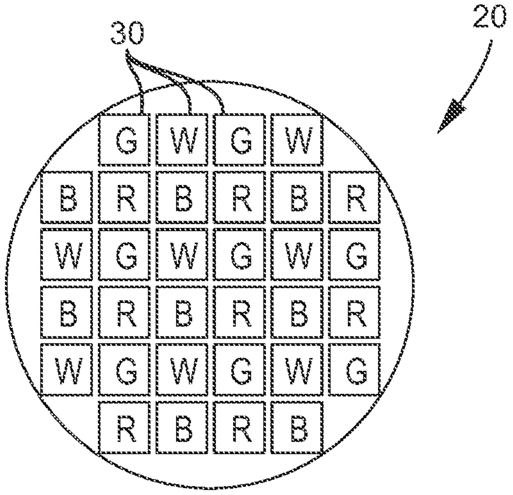
Figure 18:
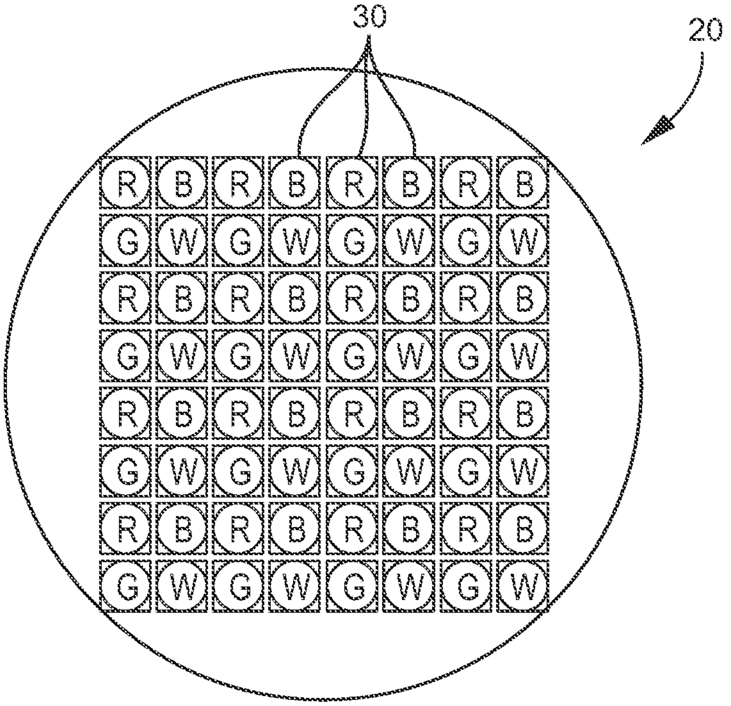

The present lighting fixture 10 may incorporate multiple different LED engines comprising strategically distributed colored LED components 30, such as indicated in the color charts of FIGS. 11-18. In these drawings, G=green, R=red, B=blue, and W=white. The LED components 30 may be arranged in horizontal rows and vertical columns, as shown. In one example, the LED components 30 are arranged such that no two like colors reside horizontally adjacent one another. In another example, the LED components 30 are arranged such that no two like colors reside vertically adjacent one another. In yet another example, the LED components 30 are arranged such that no two like colors reside either horizontally or vertically adjacent one another. FIGS. 19 and 20 are side elevations of the LED engines illustrated in FIGS. 11 and 12, respectively.

Optimal color performance in the present LED array 20 may be achieved by using LED components 30 having the highest commercially available color purity. Color purity is defined as the percentage of distance from white to the outside border of the visible spectrum. The exemplary LED array 20 can produce all colors that are contained within a polygon by graphing the X-Y coordinates of each of the colored LED groups. The present example comprises a four color high power density LED array incorporating red, blue, green and white (e.g., 3000 degrees Kelvin) LED components 30. The white LED color is ignored in the graph, unless only white LED components 30 are being used to color mix. Additive mixing of the white LED components 30 with any color combination will bring the output color of the array from its maximum color purity toward the white or pastel colors. This is often described as changing the saturation of the color. There is essentially a limitless number of color groups that may be utilized in the exemplary LED array 20.

In one exemplary embodiment, the white circuit LED components 30 of the present LED array 20 are chosen to match the dominate prevailing color temperature that is needed for the application. Most auditoriums, for example, would require the white circuit LED components 30 to match an incandescent lamp with a color temperature ranging from 2700 degrees Kelvin to 3200 degrees Kelvin. Some facilities may have windows and would desire the white circuit LED components 30 to be cooler and range from 4000 degrees Kelvin to 6000 degrees Kelvin. The selected white circuit LED components may be color shifted by adding a mixture of the red, green or blue LED components 30 as needed to create any other desired color shade. For example, a very warm LED white may be made “cooler” in the array output by adding blue and green in proportions required to yield the desired color temperature. A very cool LED white may be made “warmer” in the array output by adding red and green in proportions required to yield the desired color temperature. Virtually any color temperature can be created by mixing and combining selected LED components 30 within the LED array 20. The Color Rendering Index (CRI) of the white LED components 30 in the LED array 20 can be improved by adding in a small portion of other colors, for example, by increasing the proportion of red LED components 30 in the array color mixture.

In another exemplary embodiment, the present lighting fixture comprises a high power density LED array 20 incorporating only different varieties of white LED components 30. A four color module made with different color groups of 2700K, 3000K, 4000K, and 6000K would allow the entire output of the LED array 20 to come from only one of these colors. This would allow a lighting fixture 10 to be spot-on with the selected color at each of the 4 different white color temperature LED components 30. This may be useful for film and video where the camera particularly renders a scene best with white light-without a mixture of red, blue and green LED outputs. The output color temperature could also be varied between the highest color temperature white LED components 30 and lowest color temperature white LED components 30, while remaining reasonably close to the Planckian Locus that defines white light.

For the purposes of describing and defining the present invention it is noted that the use of relative terms, such as “substantially”, “generally”, “approximately”, and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed:

1. A lighting fixture, comprising:

an LED array comprising:

(i) an LED mounting substrate;

(ii) a plurality of LED components of various colors carried on said mounting substrate and arranged along first and second directions orthogonal to one another such that no two like colors reside orthogonally or diagonally adjacent one another, and wherein each LED component is spaced-apart from an adjacent LED component a distance no greater than 1.0 mm;

(iii) at least one LED circuit configured for electrically connecting with a power supply for powering said LED components; and an optical component.

2. The lighting fixture according to claim 1, wherein each LED component is spaced-apart from an adjacent LED component a distance less than 0.5 mm.

3. The lighting fixture according to claim 1, wherein each LED component is spaced-apart from an adjacent LED component a distance less than 0.25 mm.

4. The lighting fixture according to claim 1, wherein said LED components comprise colors selected from a group consisting of red, green, blue, and white.

5. The lighting fixture according to claim 1, wherein said LED components operate at different color temperatures designed to produce multiple distinct colors of white light.

6. The lighting fixture according to claim 1, wherein the LED circuit comprises analog dimming means for adjusting a brightness of said LED components.

7. The lighting fixture according to claim 1, wherein said optical component comprises a Fresnel lens.

8. The lighting fixture according to claim 1, wherein said optical component comprises a light diffuser lens.

9. The lighting fixture according to claim 1, wherein said optical component comprises an LED condenser lens.

10. The lighting fixture according to claim 1, wherein said LED array comprises greater than 200 LED components across a substrate surface area of less than 120 square centimeters.

11. The lighting fixture according to claim 1, wherein said LED components comprise high-brightness LED components having a maximum brightness of greater than 50 lumens.

12. The lighting fixture according to claim 1, wherein said LED mounting substrate comprises a thermally conductive ceramic material.

13. The lighting fixture according to claim 12, wherein said ceramic material is selected from a group consisting of beryllium oxide and aluminum nitride.

14. The lighting fixture according to claim 1, wherein said LED array comprises a plurality LED series circuits.

15. The lighting fixture according to claim 14, wherein each LED series circuit operatively connects multiple like-colored LED components.

16. An LED array, comprising:

a plurality of LED components of various colors, and wherein each LED component is spaced-apart from an adjacent LED component a distance no greater than 1.0 mm, and wherein said LED components are arranged along first and second directions orthogonal to one another such that no two like colors reside orthogonally or diagonally adjacent one another; and at least one LED circuit configured for electrically connecting with a power supply for powering said LED components.

* * * * *